(12) United States Patent
Leichliter et al.

(10) Patent No.: US 11,181,182 B2
(45) Date of Patent: Nov. 23, 2021

(54) THERMAL DEFLECTION APPARATUS

(71) Applicants: Chad Timothy Leichliter, Quakertown, PA (US); Steven William Butcher, Collegeville, PA (US)

(72) Inventors: Chad Timothy Leichliter, Quakertown, PA (US); Steven William Butcher, Collegeville, PA (US)

(73) Assignee: RB Distribution, Inc., Colmar, PA (US)

( * ) Notice: Subject to any disclaimer, the term of this patent is extended or adjusted under 35 U.S.C. 154(b) by 0 days.

(21) Appl. No.: 16/410,754

(22) Filed: May 13, 2019

(65) Prior Publication Data

US 2020/0362957 A1    Nov. 19, 2020

(51) Int. Cl.
*F16H 57/04* (2010.01)
*F16H 57/032* (2012.01)

(52) U.S. Cl.
CPC ....... *F16H 57/0419* (2013.01); *F16H 57/032* (2013.01)

(58) Field of Classification Search
CPC .......................... F16H 57/0419; F16H 57/031
See application file for complete search history.

(56) References Cited

U.S. PATENT DOCUMENTS

| | | | | |
|---|---|---|---|---|
| 1,564,742 A * | 12/1925 | Acker | ................ | F16H 57/0415 74/606 A |
| 2,695,726 A * | 11/1954 | Chatfield | ............... | F16H 57/029 220/327 |
| 4,872,502 A * | 10/1989 | Holzman | ............ | F16H 57/0415 165/299 |
| 5,193,415 A * | 3/1993 | Massel | .................. | B60K 17/08 180/346 |
| 5,496,069 A * | 3/1996 | Milligan | ................ | B60K 15/03 252/62 |
| 6,088,458 A * | 7/2000 | Hasegawa | ............... | F16F 15/04 381/71.4 |
| 2012/0024106 A1* | 2/2012 | Brotzki | ................. | F16H 57/027 74/606 A |
| 2012/0285090 A1* | 11/2012 | Williams | ................ | E06B 3/927 49/73.1 |
| 2014/0230602 A1* | 8/2014 | Shirley | ................ | B60K 17/303 74/606 R |
| 2015/0345613 A1* | 12/2015 | Williams | ................ | F16H 57/03 248/674 |

* cited by examiner

*Primary Examiner* — Daniel D Yabut
(74) *Attorney, Agent, or Firm* — Blank Rome LLP

(57) ABSTRACT

A Power Transfer Unit (PTU) has a housing with at least one side having an outer surface. One or more standoffs are provided at the at least one side of the housing and extend outward from the outer surface of the housing. A thermal deflector formed as a flat plate is attached to the standoffs at a predetermined distance from the outer surface of the housing. The flat plate deflects heat from nearby components, such as the catalytic converter and/or exhaust pipe, away from the PTU.

22 Claims, 4 Drawing Sheets

THERMAL DEFLECTION APPARATUS

BACKGROUND OF THE INVENTION

Field of the Invention

The present invention relates to a thermal deflection apparatus. More particularly, the present invention relates to a heat shield for an engine component or part and especially for a Power Transfer Unit.

BACKGROUND OF THE RELATED ART

Engines can have one or more components that generate excessive amounts of heat during operation. That heat can affect the operation, performance, or durability of other nearby components. For instance, the catalytic converter needs to operate at high temperatures of approximately 800 degrees Fahrenheit to operate properly. An exhaust pipe carries emissions from the catalytic converter, which is typically located close to the engine, to be exhausted at the rear of the vehicle. The emissions carried by the exhaust pipe are heated, which in turn heats the exhibit pipe. The catalytic converter and/or the exhaust pipe can be in close proximity to other engine components.

A Power Transfer Unit (PTU) is a component used to translate power from the drive axle of an engine transmission to an output shaft. The PTU has a drive axle opening 130 that receives the drive axle, and an output shaft opening 120 that receives the output shaft (see FIGS. 5, 7).

The PTU is often located close to other engine components that generate heat, such as the catalytic converter and/or exhaust pipe. In many instances, the exhaust pipe can be within 1-2 inches from the PTU. As a result, heat from the exhaust pipe will heat the PTU, which can cause the PTU to degrade and not work as efficiently. For instance, excessive heat can cause expansion in the bearings and gear bindings, resulting in catastrophic failure of the PTU. And, can cause degradation of the PTU lubrication resulting in bearing and gear binding, and also resulting in catastrophic failure of the PTU.

SUMMARY OF THE INVENTION

Accordingly, it is one object of the invention to provide a mechanism for reducing the transfer of heat from one mechanical or structural component to another. It is a further object of the invention to provide a PTU that reduces the transfer of heat from other engine components. It is yet another object of the invention to provide a heat shield that can be coupled with or integral to mechanical components to shield it from heat generated by other mechanical or structural components. It is still a further object of the invention to provide a heat shield that can be coupled with or integral to mechanical or structural components that generate heat to shield the heat from transferring to other mechanical or structural components. Without limiting the invention, a mechanical component generally refers to any device that has moving or operating parts, and a structural component generally refers to any device having an arrangement of parts.

In one non-limiting example embodiment of the invention, a Power Transfer Unit (PTU) has a housing with at least one side having an outer surface. One or more standoffs are provided at the at least one side of the housing and extend outward from the outer surface of the housing. A thermal deflector formed as a flat plate is attached to the standoffs at a predetermined distance from the outer surface of the housing. The flat plate deflects heat from nearby components, such as the catalytic converter and/or exhaust pipe, away from the PTU.

These and other objects of the invention, as well as many of the intended advantages thereof, will become more readily apparent when reference is made to the following description, taken in conjunction with the accompanying drawings.

DETAILED DESCRIPTION OF THE INVENTION

Figure 1:
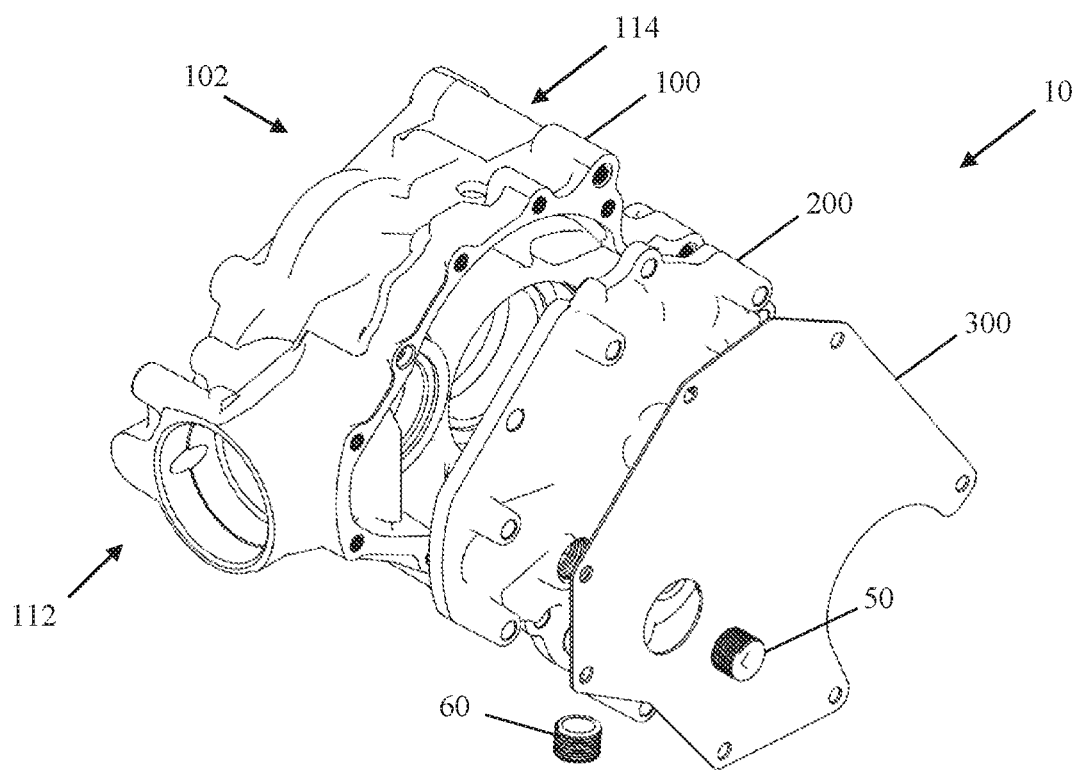
FIG. 1 is an exploded perspective view of a Power Transfer Unit assembly in accordance with one embodiment of the invention.

In describing the illustrative, non-limiting embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several embodiments of the invention are described for illustrative purposes, it being understood that the invention may be embodied in other forms not specifically shown in the drawings.

Figure 2:
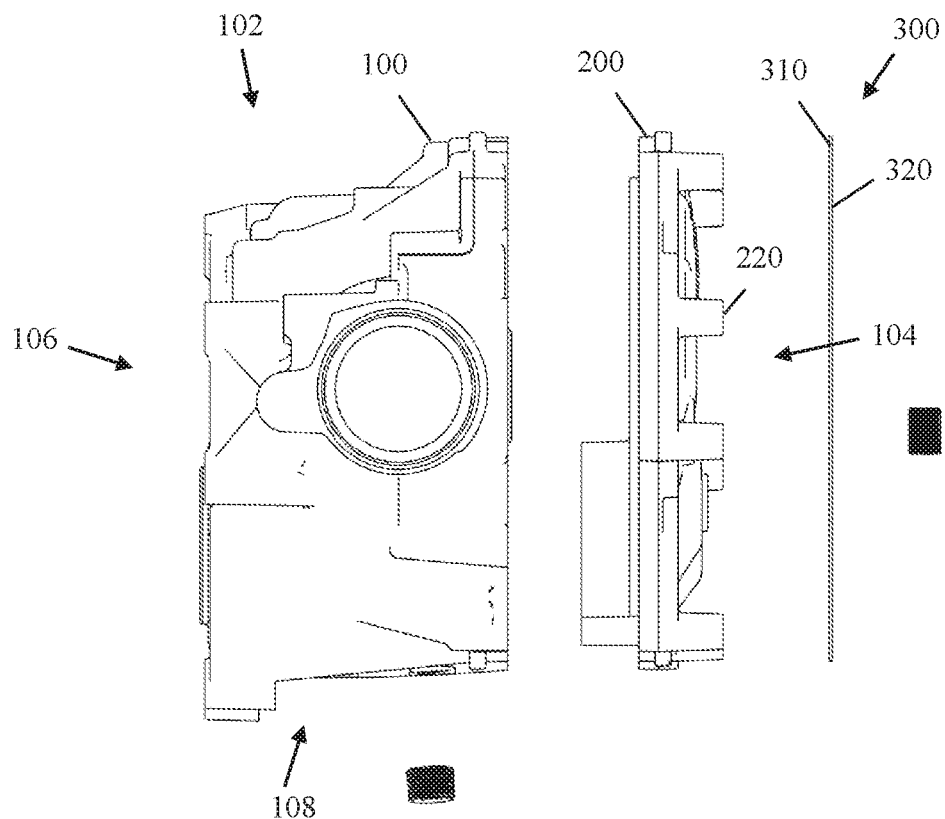
FIG. 2 is an exploded rear view of the PTU of FIG. 1.

Turning to the drawings, FIGS. 1, 2 show a PTU assembly 10 in accordance with one embodiment of the invention. The assembly 10 includes a PTU housing 100, PTU face plate 200 and a thermal deflection apparatus or heat shield 300. The PTU face plate 200 attaches to the PTU housing 100. One or more mounting holes can be provided in the housing 100 and/or the face plate 200 to mount the housing 100 to the vehicle and or engine.

The PTU housing 100 and the PTU face plate 200 together form a single unit, such as a Power Transfer Unit component. Referring to FIGS. 1, 2, the combined housing 100 and face plate 200 together have a top 102, right side 104, left side 106, bottom 108, front 112, and rear 114. The face plate 200 forms the right side 104 of the housing 100. Though only a single face plate 200 is shown, a face plate 200 can be located at each side 104, 106 of the PTU housing 100.

Figure 3:
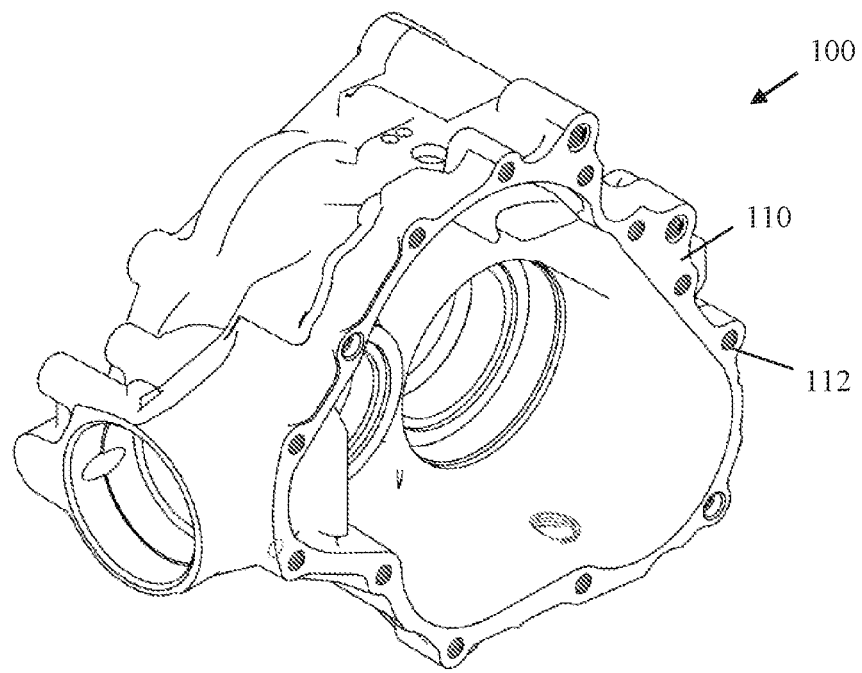
FIG. 3 is a perspective view of the PTU housing.
Figure 4:
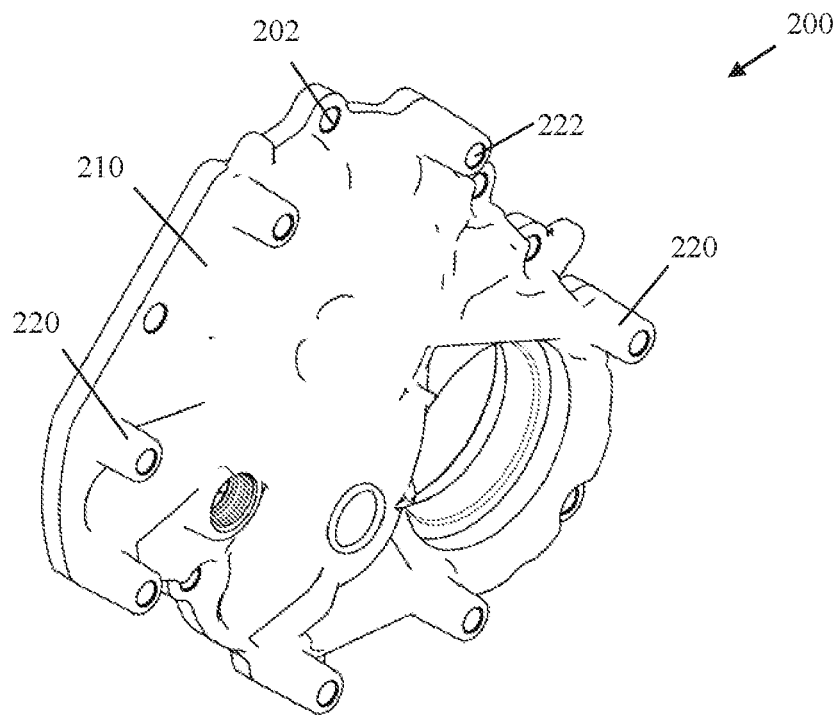
FIG. 4 is a perspective view of the PTU face plate.

Referring momentarily to FIGS. 3, 4, the housing 1.00 has walls that form an outer periphery with an outward facing surface 100. One or more threaded openings 112 are provided in the outward facing surface 100. And, the face plate 200 is generally a thin plate that can have a curved outer surface 210. The face plate can be sized and shaped to substantially match the housing 100. Openings 202 are provided at the outer periphery of the face plate 200. Fasteners, such as threaded screws, can pass through the openings 202 and received in the threaded openings 112 of the housing, to removably couple the face plate 200 to the PTU housing 100 to form a complete sealed enclosure.

Figure 5:
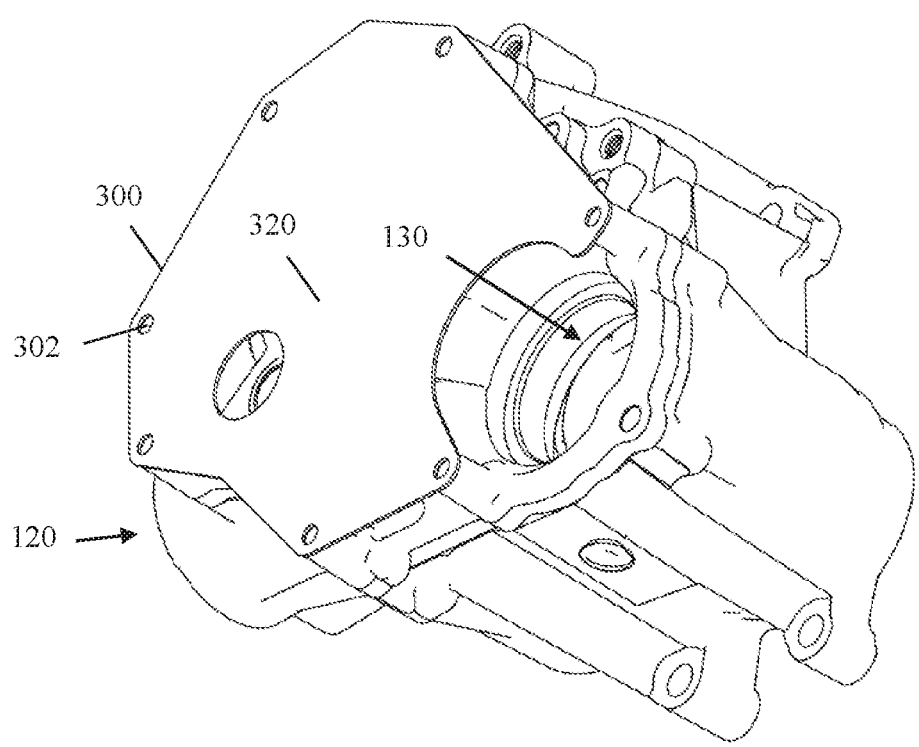
FIG. 5 is a perspective view of the assembled PTU assembly of FIG. 1.
Figure 6:
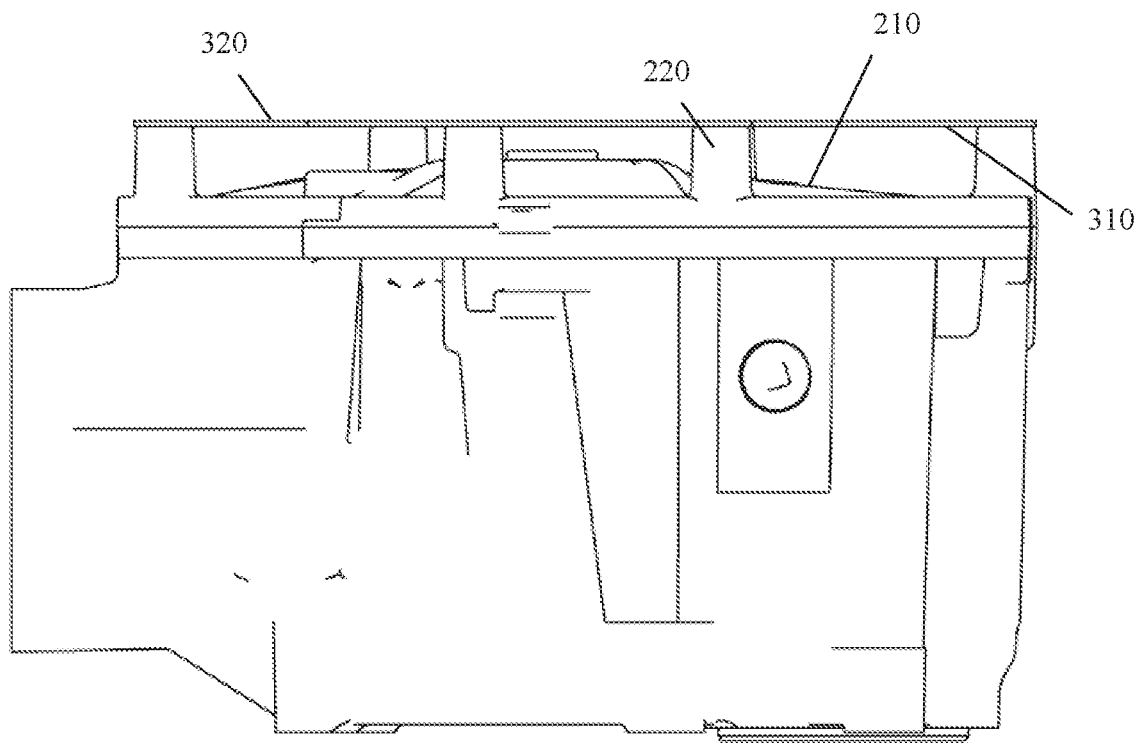
FIG. 6 is a bottom view of the assembled PTU assembly of FIG. 1.
Figure 7:
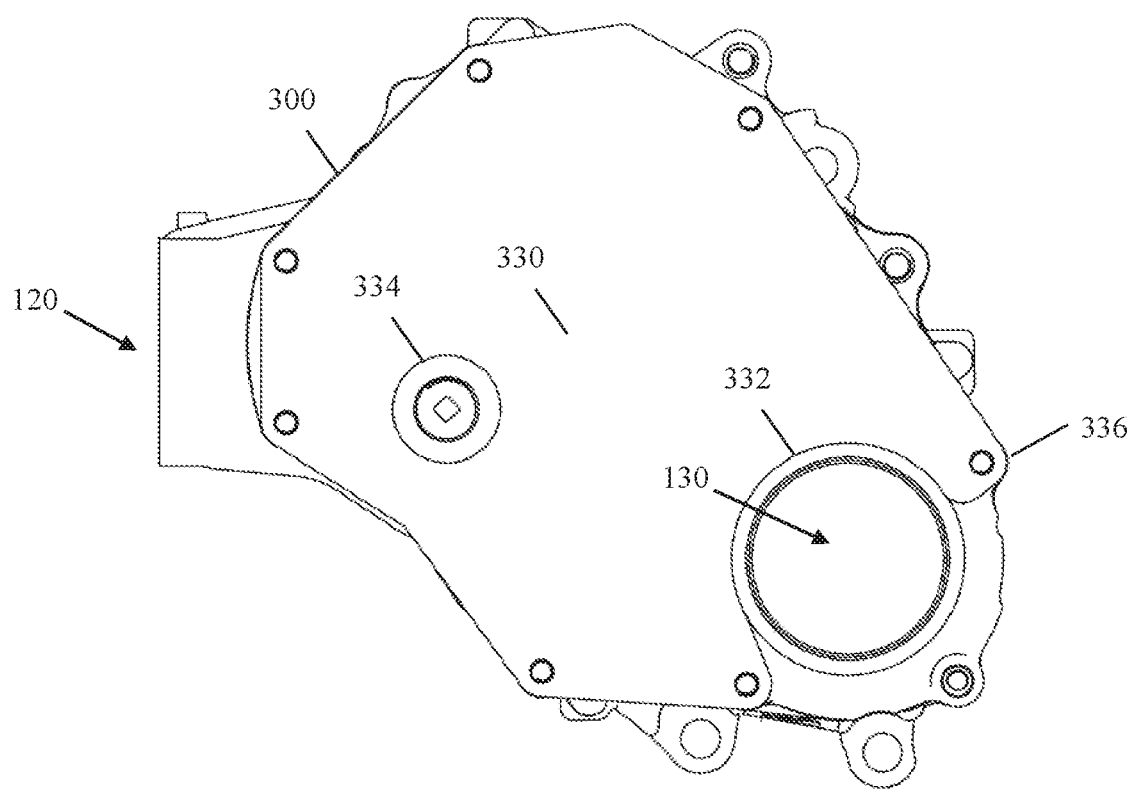
FIG. 7 is a side view of the assembled PTU assembly of FIG. 1.

Referring now to FIGS. 5, 7, the face plate has a drive shaft opening 130 that receives the transmission drive shaft. And, the housing 100 has an output shaft opening 120 that receives the PTU output shaft. The PTU housing 100 houses the components that translate motion from the drive shaft to the output shaft. In addition, fill plug 50 can be threadably and removably engaged with a plug opening in the face plate 200. And a drain plug 60 can be threadably and removably engaged with a plug opening in the housing 100. The plugs 50, 60 can be removed to allow oil or liquid to be drained from the housing 100, and the face plate(s) 200 can be removed from the housing 100, to allow for easy servicing of the PTU. Any suitable plug 50, 60 can be utilized, such as a magnetic plug that draws and captures metal filings from the lubrication. 100211 Turning back to FIG. 1, the heat shield 300 attaches to the face plate 200. As further shown in FIGS. 1, 2, 4, 6, one or more standoffs 220 are provided about the outer surface 210 of the face plate 200. In one embodiment, the standoffs 220 are arranged at the outer periphery of the face plate 200. The standoff 220 can be integrally formed with the face plate 200. A threaded opening 222 is provided in the standoff 220. The standoff 220 projects outward from the outer surface 210 of the face plate 200. The standoff 220 can be circular to form a tube structure.

Referring to FIGS. 2, 6, 7, the heat shield 300 has a body 330 that is a thin flat planar plate having a linear inward-facing side 310 and a linear outward facing side 320. As shown in FIGS. 1, 5, 7, the heat shield 300 is continuous and be substantially the same size and shape as the face plate 200 to protect the face plate 200 and/or housing 100 against heat from nearby components. However, in other embodiments, the heat shield 300 can be larger or smaller than, or contoured to (i.e., a non-linear shield 300), the face plate 200 and/or the housing 100. The heat shield 300 can have a number of structural features including a circular section 332, an opening 334, and rounded corners 336. The circular section 332 extends at least partially about the drive shaft opening 130 to permit the drive shaft to access the opening 130. In one embodiment, the circular section 332 can form a complete circle that surrounds the opening 130. The optional opening 334 is aligned about the plug 50 (if used) so that the plug 50 can be readily inserted and removed from the face plate 200. The outer edge of the shield 300 has rounded corners 336 to avoid injury to a person servicing the PTU assembly 10.

One or more through-holes 302 (FIG. 5) are provided in the heat shield 300 aligned with the standoffs 210 of the face plate 200. In one embodiment, the through-holes 302 are positioned at the outer periphery of the heat shield 300. A fastener, such as a threaded screw, passes through the through-holes 302 and are received in the threaded opening 222 of the standoff 220 to removably and reliably secure the heat shield 300 to the face plate 200. Though standoffs 220 and through-holes 302 are shown at the outer periphery of the face plate 200 and shield 300, they can be provided at other suitable locations such as in the middle or center of the face plate 200 and shield 300, as needed to reliably support and connect the shield 300 to the face plate 200.

In another embodiment of the invention, the heat shield 300 need not have any through-holes 302, and the standoffs 220 need not have threaded openings 222. Rather, the shield 300 can be attached to the standoffs 220 in any suitable manner, such as by an adhesive or by one or more welds.

As best shown in FIG. 6, the inwardly-facing surface 310 of the heat shield 300 faces the outer surface 210 of the face plate 200. And the outward-facing surface 320 of the heat shield 300 faces away from the housing 100 and the face plate 200. The planar heat shield 300 is set apart from and substantially parallel to the curved outer surface 210 of the face plate 300 and/or to the central axis of the face plate 200. Thus, there is a gap or space between the inner surface 310 of the heat shield 300 and the outer surface 210 of the face plate 300 to define a predetermined distance between the heat shield 300 and the outer surface 210 of the face plate 300 of the housing 100.

The heat shield 300 blocks or deflects external heat emitted by nearby components, such as the catalytic converter and/or exhaust pipe, from reaching the face plate 200 and housing 100. And the gap between the heat shield 300 and the face plate 200 further insulate the face plate 200 and housing 100 to prevent heat from reaching the face plate 200. The gap should be large enough to insulate the housing 100 from heat, but not too large as to obstruct other nearby components. In one embodiment, the gap can be about 0.050-0.060 inches at the closest point and up to about 0.50 inches at the furthest point. The larger the gap, the better the insulating. Heat passing into the gap can escape around the sides of the heat shield 300 by circulating air due to motion of the vehicle and/or a fan or blower. The heat shield 300 can be any suitable thickness, and in one example embodiment can be 0.055-0.062 inches thick. The thickness optimizes the heat deflection without interfering with surrounding components and maintaining a minimum air gap.

Figure 8:
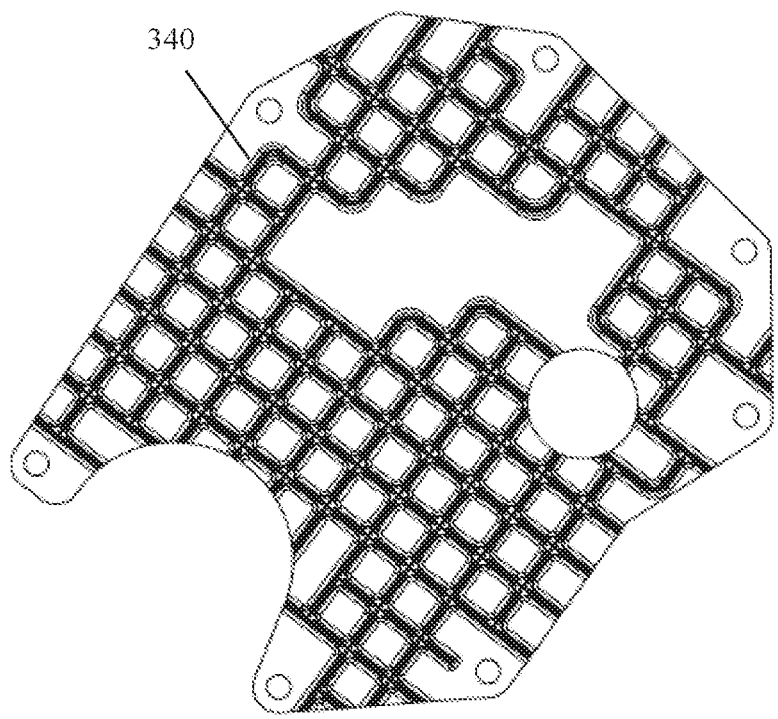
FIG. 8 is a top view of a heat shield having support ridges in accordance with one embodiment of the invention.

Turning to FIG. 8, the heat shield 300 can have one or more support or strengthening features, such as support ridges 340. In one embodiment, the support ridges 340 are formed in the plate, such as by being stamped into the plate to project from one side to the other. In one non-limiting embodiment, the ridges 340 can be stamped, and then the heat shield 300 can be punched to the desired size and shape. The ridges 340 strengthen the heat shield 300. The ridges 340 can form a pattern, such as rows and columns and track the shape of the heat shield, as shown. The support features can be formed integral with or attached to the heat shield The heat shield 300 can be provided with other suitable features, such as to further deflect heat.

Thus, the thermal deflection apparatus or heat shield 300 deflects heat away from the housing 100 and/or face plate 200. The heat shield 300, as well as the housing 100 and the face plate 200, can be made of metal, though other suitable materials can be utilized for the heat shield 300 such as high temperature plastics. It is noted that the in the example embodiment of the invention shown and described above, the heat shield 300 is shown connected to a PTU housing and face plate 100, 200 to protect the PTU against external heat reaching the PTU. However, the heat shield can also be integral with our coupled to a heat-generating component, such as to the catalytic converter, to block heat from reaching nearby components. And, the heat shield can be utilized with other components other than a PTU housing 100 and/or face plate 200, to block or deflect heat from one mechanical or structural component from reaching a second mechanical or structural component.

And, the face plate 200 need not be a separate device but can be integrally formed with and is part of the PTU housing 100, so that the heat shield 300 connects directly to the PTU housing 100. And the heat shield need not be used in a vehicle engine, but can be applied to any suitable mechanical or structural device in addition, though the non-limiting embodiments show a single heat shield 300 attached to the housing 100, more than one heat shield 300 can be provided. For example, a heat shield 300 can be provided at the tight side 104 of the housing 100, the left side 106 of the housing 100, and/or at any of the other sides 102, 108, 112, 114 of the housing.

In addition, more than one heat shield can be attached to any one side 102, 104, 106, 108, 112, 114 of the housing 100. And the heat shield 300 need not have the same shape or outer periphery as the housing 100 or the face plate 200. Still further, although the heat shield 300 is shown as a separate element that is removably attached to the face plate 200 of the housing 100, the heat shield 300 can be integral with the face plate 200. And, the heat shield 300 need not be planar, but can be any suitable shape including, for example, curved, stepped, tapered, bent or angled. And while the standoff is shown as part of the housing (face plate), it can instead be part of the shield 300 that attaches to the housing, or a separate that is attached to both the housing and the shield.

It is further noted that the description and claims use several geometric or relational terms, such as circular, rounded, parallel, planar, linear, and flat. In addition, the description and claims use several directional or positioning terms and the like, such as top, bottom, front, rear, left side, right side, inward and outward. Those terms are merely for convenience to facilitate the description based on the non-limiting example embodiments shown in the figures. Those terms are not intended to limit the invention. Thus, it should be recognized that the invention can be described in other ways without those geometric, relational, directional or positioning terms. In addition, the geometric or relational terms may not be exact. For instance, walls may not be exactly perpendicular or parallel to one another but still be considered to be substantially perpendicular or parallel because of, for example, roughness of surfaces, tolerances allowed in manufacturing, etc. And, other suitable geometries and relationships can be provided without departing from the spirit and scope of the invention.

The foregoing description and drawings should be considered as illustrative only of the principles of the invention. The invention may be configured in a variety of shapes and sizes and is not intended to be limited by the embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A thermal deflection apparatus for use with a mechanical or structural component having a component size and a component shape, the thermal deflection apparatus comprising:
   a heat shield having a shield size that is substantially the same as the component size and a shield shape that is substantially the same as the component shape, wherein the heat shield is a thermal deflector that deflects heat from an external source away from the mechanical or structural component, and wherein an opening is formed in said heat shield to provide access to a feature on the mechanical or structural component;
   a fastener removably attaching said heat shield to the mechanical or structural component to provide a gap between said heat shield and said mechanical or structural component, and
   an outer edge of the heat shield has a partial circular section that extends about a drive shaft opening of the mechanical or structural component to permit a drive shaft to access the drive shaft opening.

2. The thermal deflection apparatus of claim 1, whereby said heat shield is positioned between 0.050 and 0.060 inches from an outer surface of the mechanical or structural component when attached to the mechanical or structural component.

3. The thermal deflection apparatus of claim 1, wherein said heat shield has a first inwardly facing side that faces the mechanical or structural component, and a second outwardly facing side that faces away from the mechanical or structural component.

4. The thermal deflection apparatus of claim 1, wherein the feature comprises a plug or a plug opening.

5. The thermal deflection apparatus of claim 1, wherein said heat shield comprises a contoured plate that is non-linear and contoured to the component.

6. The thermal deflection apparatus of claim 1, further comprising one or more support ridges formed in or on said shield.

7. The thermal deflection apparatus of claim 1, wherein said component comprises a Power Transfer Unit.

8. The thermal deflection apparatus of claim 1, wherein the heat shield is positioned between the mechanical or structural component and a catalytic converter.

9. The thermal deflection apparatus of claim 1, wherein said heat shield has an outer heat shield perimeter that is substantially the same as an outer component perimeter of the component.

10. The thermal deflection apparatus of claim 1, wherein the component size includes a component length and a component width and said heat shield has a heat shield length and a heat shield width, wherein said heat shield length is substantially the same as the component length and said heat shield width is substantially the same as the component width.

11. The thermal deflection apparatus of claim 1, wherein the mechanical or structural component has a housing, and said fastener removably attaches said heat shield to the housing of the mechanical or structural component.

12. A Power Transfer Unit, comprising:
   a housing having at least one side with an outer surface;
   one or more standoffs at the at least one side of said housing and extending outward from the outer surface of said at least one side;
   a thermal deflector attached to said one or more standoffs at a predetermined distance from the outer surface, wherein said thermal deflector deflects heat from an external source away from said housing and has a gap with respect to the outer surface of said housing, and wherein an opening is formed in said thermal deflector to provide access to a feature on the housing, and
   an outer edge of the thermal deflector has a partial circular section that extends about a drive shaft opening of the housing to permit a drive shaft to access the opening.

13. The Power Transfer Unit of claim 12, each of said one or more standoffs having a threaded opening, and said thermal deflector having a through-hole aligned with said threaded opening, and further comprising a fastener extending through the through-hole and received in the threaded opening to removably attach said thermal deflector to said housing.

14. The Power Transfer Unit of claim 12, said at least one side of said housing comprising a face plate removably attached to said housing.

15. The Power Transfer Unit of claim 12, wherein said thermal deflector is removably attached to said one or more standoffs.

16. The Power Transfer Unit of claim 12, wherein said thermal deflector is fixedly attached to said one or more standoffs.

17. The Power Transfer Unit of claim 12, wherein said thermal deflector is integrally formed with said one or more standoffs.

18. The Power Transfer Unit of claim 12, wherein said thermal deflector comprises a contoured plate that is non-linear and contoured to the housing, with a first inwardly facing side that faces the housing, and a second outwardly facing side that faces away from the housing.

19. The Power Transfer Unit of claim 12, wherein said thermal deflector deflects heat away from said housing.

20. The Power Transfer Unit of claim 12, wherein the feature comprises a plug or a plug opening.

21. The Power Transfer Unit of claim 12, wherein said thermal deflector comprises a flat or contoured plate.

22. The Power Transfer Unit of claim 12, further comprising one or more support ridges formed in or on said thermal deflector.

\* \* \* \* \*